(12) United States Patent
Zeisler

(10) Patent No.: US 10,578,710 B2
(45) Date of Patent: Mar. 3, 2020

(54) DIAGNOSTIC METHOD FOR A VISION SENSOR OF A VEHICLE AND VEHICLE HAVING A VISION SENSOR

(71) Applicant: Bayerische Motoren Werke Aktiengesellschaft, Munich (DE)

(72) Inventor: Joeran Zeisler, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/802,602

(22) Filed: Nov. 3, 2017

(65) Prior Publication Data

US 2018/0052222 A1 Feb. 22, 2018

Related U.S. Application Data

(63) Continuation of application No. PCT/EP2016/059883, filed on May 3, 2016.

(30) Foreign Application Priority Data

May 5, 2015 (DE) .................. 10 2015 208 228

(51) Int. Cl.
*G01S 15/00* (2006.01)
*G01S 7/40* (2006.01)
(Continued)

(52) U.S. Cl.
CPC ............ *G01S 7/4004* (2013.01); *G01S 7/497* (2013.01); *G01S 7/52004* (2013.01);
(Continued)

(58) Field of Classification Search
CPC ................................ G01S 7/4004; G06T 7/73
See application file for complete search history.

(56) References Cited

U.S. PATENT DOCUMENTS 8,605,947 B2* 12/2013 Zhang ................ G06K 9/00798
348/116
9,201,424 B1* 12/2015 Ogale ....................... G06T 7/80
(Continued)

FOREIGN PATENT DOCUMENTS

DE 10 2007 037 178 A1 3/2009
DE 10 2007 043 460 A1 3/2009
(Continued)

OTHER PUBLICATIONS

International Search Report (PCT/ISA/210) issued in PCT Application No. PCT/EP2016/059883 dated Jul. 14, 2016 with English translation (seven pages).

(Continued)

*Primary Examiner* — Jess Whittington
(74) *Attorney, Agent, or Firm* — Crowell & Moring LLP

(57) ABSTRACT

A diagnostic method is provided for a vision sensor of a vehicle. The diagnostic method includes the steps of: determining a first position and a direction of movement of the vehicle; selecting a stationary landmark suitable for being detected by the vision sensor from a landmark database, wherein the landmark is located in front of the vehicle in the direction of movement of the vehicle, wherein a distance from the first position of the vehicle to the landmark is greater than the target range of the vision sensor; detecting the landmark via the vision sensor and, in response to a successful detection of the landmark by the vision sensor; determining a second position of the vehicle; determining an actual range of the vision sensor as the distance between the second position of the vehicle and the landmark.

5 Claims, 2 Drawing Sheets

(51) Int. Cl.
*G01S 7/497* (2006.01)
*G01S 7/52* (2006.01)
*G01S 13/931* (2020.01)
*G01S 17/93* (2020.01)
*G01S 15/931* (2020.01)
*G06T 7/73* (2017.01)
*G01S 13/93* (2020.01)

(52) U.S. Cl.
CPC .......... *G01S 13/931* (2013.01); *G01S 15/931* (2013.01); *G01S 17/936* (2013.01); *G06T 7/73* (2017.01); *G01S 2007/4039* (2013.01); *G01S 2007/4975* (2013.01); *G01S 2007/52009* (2013.01); *G01S 2013/936* (2013.01); *G01S 2013/9339* (2013.01); *G01S 2013/9364* (2013.01); *G01S 2013/9367* (2013.01); *G06T 2207/10016* (2013.01); *G06T 2207/30252* (2013.01)

(56) References Cited

U.S. PATENT DOCUMENTS

| | | | |
|---|---|---|---|
| 2008/0144924 A1* | 6/2008 | Hoffmann | G06T 7/85 382/154 |
| 2010/0076710 A1 | 3/2010 | Hukkeri et al. | |
| 2010/0225764 A1* | 9/2010 | Nizko | G01S 7/4004 348/152 |
| 2011/0096165 A1* | 4/2011 | Zeng | B60J 3/0204 348/148 |
| 2012/0007985 A1* | 1/2012 | Inui | H04N 17/002 348/148 |
| 2012/0101704 A1* | 4/2012 | Wagner | G01S 7/003 701/96 |
| 2012/0173185 A1* | 7/2012 | Taylor | G01B 11/026 702/104 |
| 2014/0043473 A1* | 2/2014 | Gupta | H04N 17/00 348/135 |
| 2014/0046587 A1* | 2/2014 | Rintanen | G01S 7/4808 701/469 |
| 2014/0184799 A1* | 7/2014 | Kussel | G01B 11/272 348/148 |
| 2014/0184814 A1* | 7/2014 | Lin | H04N 17/002 348/187 |
| 2014/0247354 A1* | 9/2014 | Knudsen | B60R 1/00 348/148 |
| 2014/0320658 A1* | 10/2014 | Pliefke | B60R 1/002 348/148 |
| 2017/0023945 A1* | 1/2017 | Cavalcanti | G08G 1/0116 |

FOREIGN PATENT DOCUMENTS

| | | |
|---|---|---|
| DE | 10 2007 046 648 A1 | 4/2009 |
| DE | 10 2010 049 091 A1 | 4/2012 |
| WO | WO 2006/069978 A2 | 7/2006 |

OTHER PUBLICATIONS

German-language Written Opinion (PCT/ISA/237) issued in PCT Application No. PCT/EP2016/059883 dated Jul. 14, 2016 (eight pages).

German-language Search Report issued in counterpart German Application No. 10 2015 208 228.8 dated Jan. 28, 2016 with partial English translation (12 pages).

* cited by examiner

DIAGNOSTIC METHOD FOR A VISION SENSOR OF A VEHICLE AND VEHICLE HAVING A VISION SENSOR

CROSS REFERENCE TO RELATED APPLICATIONS

This application is a continuation of PCT International Application No. PCT/EP2016/059883, filed May 3, 2016, which claims priority under 35 U.S.C. § 119 from German Patent Application No. 10 2015 208 228.8, filed May 5, 2015, the entire disclosures of which are herein expressly incorporated by reference.

BACKGROUND AND SUMMARY OF THE INVENTION

The present invention relates to a diagnostic method for a vision sensor of a vehicle and to a vehicle having a vision sensor.

Modern vehicles, in particular motor vehicles, have a multiplicity of driver assistance systems which can assist the driver or relieve the pressure on the driver during his driving activity. Vehicles which can carry out some driving tasks entirely or partially without the intervention of the vehicle driver are known. The operation of such vehicles has become known under the term partially or fully automatic or partially or fully autonomous driving. These driver assistance systems require the most comprehensive possible image of the traffic situation surrounding the vehicle. For this purpose, modern vehicles have a multiplicity of vision sensors which can detect the area surrounding the vehicle. This makes it possible to sense and detect objects in the area surrounding the vehicle. Such objects may be other vehicles, pedestrians, cyclists, traffic signs, structures and the like. Movable and immovable objects may be detected.

In order to guarantee reliable operation of the driver assistance systems, the functionality of the vision sensors must be ensured. However, this may be impaired. On the one hand, the vision sensors as such may be defective or may have restricted functionality. On the other hand, the functionality of a vision sensor may be restricted by external influences. Examples of such external influences are, for example, fog, rain and a soiled sensor outer surface. So that a driver assistance system which uses data provided by a vision sensor in turn functions properly, it should be ensured that the data provided by the vision sensor are not corrupted by a functional incapacity of the type mentioned above. It has therefore been proposed to carry out methods for identifying a restricted functionality of vision sensors. If it is identified during such a method that the functionality of the vision sensor is restricted, the driver assistance system can reject the data provided by this vision sensor or can attribute a reduced importance to them during data processing or can take further suitable measures.

A method for operating a sensor of a vehicle is known from DE 10 2010 049 091 A1. In this case, position data relating to an object are first of all received and a position of the object is determined. If this position is in a predetermined detection range of a sensor of the vehicle, it is determined whether the object is detected by the sensor. If this is not the case, a warning message can be output and/or a driver assistance system can be adjusted.

The disadvantage of the method known from the prior art is that it can only be carried out with objects which are set up to transmit their position data. The object must therefore be set up for data transmission, which does not apply to a multiplicity of objects. Furthermore, the method may be inaccurate when the object is a movable object on account of the movement of the object. A further disadvantage is that the vehicle requires a receiving device for receiving the position data transmitted by the object in order to carry out the method.

On the basis of the prior art, the object of the invention is to provide a diagnostic method for a vision sensor of a vehicle, which diagnostic method can be used in as versatile a manner as possible, can be easily carried out and is reliable. The object is also to provide a vehicle having a vision sensor which is suitable for carrying out such a diagnostic method.

These and other objects are achieved in the case of a diagnostic method and a vehicle in accordance with embodiments of the invention.

In a first step of the method according to the invention, a first position and a direction of movement of the vehicle are determined. The first position is that geographical position at which the vehicle is situated at the time of carrying out the method step. The process of determining the first position preferably comprises determining the geographical coordinates (geographical latitude and longitude) of the first position. Apparatuses of the vehicle which are known per se can be used to determine the first position and/or the direction of movement of the vehicle, in particular a satellite navigation system of the vehicle. The direction of movement of the vehicle can be determined as a direction vector. This direction vector can be determined with reference to a reference coordinate system (for example world coordinate system). The direction of movement of the vehicle can also be determined with reference to an object of the traffic infrastructure. For example, if the vehicle is traveling on a road, the direction of travel with reference to the road being traveled on can also be stated as the direction of movement. For example, such a statement could be "Route 1 in a northerly direction" or "Freeway A9 in the direction of Munich".

In a subsequent method step, a stationary landmark suitable for detection by the vision sensor is selected from a landmark database. A stationary landmark may also be referred to as an immovable landmark. The stationary landmark is therefore an object which is always at the same location. The landmark database is a database which stores information relating to landmarks. The contents stored in the landmark database may have been acquired and provided by a provider, for example. The landmark database may contain a multiplicity of items of information for a particular landmark. At least the type of landmark and its geographical position must be stored in the landmark database for each landmark which is suitable for carrying out the method according to the invention. On the basis of the information relating to the type of landmark, it is possible to determine whether the landmark is suitable for detection by the vision sensor. The geographical position of the landmark must be known so that the landmark can be selected, as described above, in such a manner that it is in front of the vehicle in the direction of movement. Moreover, the information relating to the geographical position is required in the further course of the method.

Three conditions are taken into account when selecting the landmark. Firstly, the landmark must be suitable for detection by the vision sensor. If the vision sensor is a radar sensor, for example, the landmark must be a landmark which can be detected by a radar sensor. In contrast, a landmark which cannot be detected by a radar sensor on account of its nature is not suitable in this example. Secondly, the landmark must be in front of the vehicle in the direction of movement of the vehicle. In other words, a landmark toward which the vehicle is moving is selected. It is not necessary for the vehicle to move toward the landmark head-on. The landmark therefore need not be directly in front of the vehicle in the direction of movement. It is only necessary for the distance between the vehicle and the landmark to be reduced during movement of the vehicle in the direction of movement. The landmark may therefore be a landmark at the side of the road which will be passed by the vehicle during its journey (that is to say its movement in the direction of movement). Thirdly, a distance between the first position of the vehicle and the landmark must be greater than the desired range of the vision sensor. In other words, the landmark is selected in such a manner that it cannot yet be detected by the vision sensor at the time at which the vehicle is at the first position because it is outside the detection range of the sensor. However, the landmark is selected in such a manner that it will enter the detection range of the vision sensor at a later time at which the vehicle has already moved further in its direction of movement. A course of the road ahead (for example a road course) can preferably be taken into account when selecting the landmark. This makes it possible to ensure that the selected landmark can actually be detected by the vision sensor over the further driving course.

In a subsequent method step, the landmark is detected by the vision sensor. This step is carried out continuously or repeatedly until the vision sensor has successfully detected the landmark. As explained above, the landmark is initially still outside the detection range of the vision sensor. Since the step of detecting the landmark by means of the vision sensor is carried out continuously or repeatedly while the vehicle is moving in the direction of the landmark, the vision sensor will successfully detect the landmark as soon as the landmark enters the actual detection range of the vision sensor (determined by the actual range of the vision sensor).

Provision may preferably be made for the method to be aborted and started from the beginning if the vehicle has passed the landmark (that is to say the distance between the vehicle and the landmark increases again) but the landmark could not be successfully detected.

In response to detection of the landmark by the vision sensor (that is to say as soon as the landmark has been successfully detected by the vision sensor), a step of determining a second position of the vehicle is carried out according to the invention. In other words, the position of the vehicle at the time at which the landmark was successfully detected by the vision sensor is determined. In a final method step, the actual range of the vision sensor is determined as the distance between the second position of the vehicle and the landmark.

The method according to the invention therefore makes it possible to determine the actual range of the vision sensor in a simple manner by using the fact that the exact position of the landmark to be detected and detected by the vision sensor is known a priori. As soon as the vision sensor successfully (that is to say actually) detects the landmark, the distance between the vision sensor and the landmark corresponds to the actual range of the vision sensor.

Embodiments of the invention provide for the vision sensor to be a camera, a laser sensor, a radar sensor, an ultrasonic sensor or a bolometer. The term laser sensor should be broadly understood and also comprises, in particular, a lidar sensor. Vision sensors of the type mentioned are used, in particular, in motor vehicles in order to detect objects in the area surrounding the motor vehicle. Modern motor vehicles having a partially automatic or fully automatic driving mode may have numerous vision sensors of different types which continuously detect the area surrounding the motor vehicle. The same landmark can be used, in a particularly advantageous manner, to determine the respective actual ranges of a plurality of vision sensors. For this purpose, the method is carried out for each of the plurality of vision sensors, the same landmark being selected in each of the methods. For this purpose, the landmark must be suitable for detection by each of the vision sensors. If, for example, a lidar sensor and a radar sensor of a vehicle are intended to be tested using the same landmark, the landmark must be suitable both for detection by a lidar sensor and for detection by a radar sensor.

Provision is made, in a particularly advantageous manner, for the landmark to be a coded landmark. A coded landmark is a landmark which cannot only be detected by a vision sensor but has at least one coding feature which is used primarily or solely for the better detectability of the landmark by a vision sensor. For example, numerous objects of the traffic infrastructure (road signs, traffic signs, road markings, structures, for example bridges) are suitable for detection by vision sensors, in particular cameras and lidar sensors. However, these are generally not coded landmarks. In contrast, a coded landmark has a coding feature. A coded landmark may be an object of the traffic infrastructure (for example road signs, traffic signs, road markings, structures, for example bridges) which, in addition to its actual purpose, has been provided with a coding feature. Alternatively, a coded landmark may also be an object which is used solely as a coded landmark. A coding feature of a coded landmark may be such that it can be detected particularly well by a vision sensor of a particular type (for example camera, radar sensor, lidar sensor, ultrasonic sensor). A coding feature may be such that it can be detected particularly well by vision sensors of different types. In other words, a coding feature may be selected in such a manner that the coded landmark comprising the coding feature is suitable for detection by vision sensors of different types, for example both by a camera and by a lidar sensor. The configuration of a coding feature, in particular with regard to its shape, its color, its acoustic properties and/or its electromagnetic properties (including its optical properties), may be such that it can be detected particularly well by the vision sensor, on the one hand, and makes it possible to distinguish the coded landmark from other objects, on the other hand. In other words, the coding feature may be configured in such a manner that the coded landmark differs to the greatest possible extent from other objects, with the result that random confusion of the coded landmark with another object is as unlikely as possible. A coding feature may comprise an item of information which can be concomitantly acquired by the vision sensor when detecting the coded landmark (and therefore when detecting the coding feature). Such an item of information may be a unique identifier of the coded landmark, for example. Such an item of information may be, for example, a statement of the geographical position of the coded landmark.

For detection by active vision sensors, retroreflective coding features are advantageously suitable, which coding features have, in a particularly advantageous manner, a depth structure in order to enable detection from different directions. Active vision sensors are those vision sensors which emit a signal. The active vision sensors include, for example, radar sensors, lidar sensors and ultrasonic sensors. Passive vision sensors can be distinguished from active vision sensors. Passive vision sensors are set up to receive a signal without previously having emitted their own signal.

The passive vision sensors include cameras, for example. Coding features which, on account of their configuration, cannot be confused with objects randomly occurring in the environment and, in particular, comprise an item of information, for example a unique identifier, are advantageously suitable for detection by passive vision sensors.

The size of the coding feature may be advantageously selected on the basis of the desired range and/or a resolution of a vision sensor suitable for detecting the coded landmark.

Provision may be made for coded landmarks to preferably be selected when selecting the landmark. If, during the step of selecting the stationary landmark suitable for detection by the vision sensor from the landmark database, it is therefore possible to select from a plurality of landmarks, the step may comprise preferably selecting a coded landmark.

With further advantage, the landmark is a passive landmark. In contrast to an active landmark, a passive landmark is a landmark which is not set up to actively emit a signal. The method according to the invention is not dependent on the landmark emitting a signal which can be used to identify it as a landmark and which possibly contains the position of the landmark. The method can be used in a versatile manner by using passive landmarks for the method. This is because, whereas the installation and operation of active landmarks are relatively complicated, passive landmarks can be used in large numbers. In particular, all suitable objects of the traffic infrastructure can be used for the method according to the invention without further measures if they are recorded in the landmark database, as described above.

In a further configuration, an uncertainty range of the first position of the vehicle and/or an uncertainty range of a position of the landmark is/are additionally determined. The uncertainty range of the first position of the vehicle may be determined, for example, by that apparatus of the vehicle which determines the first position of the vehicle, that is to say by a satellite navigation system of the vehicle, for example. Said satellite navigation system can determine, for example in a manner known per se, an uncertainty range on the basis of the number of satellites which could be used during position determination and on the basis of the signal quality of the signals received from the satellites. The uncertainty range may include, for example, a statement of a radius around the first position within which the actual position of the vehicle is located with a predefined probability, for example 90% or 95%. The uncertainty range of the position of the landmark may be recorded in the landmark database, for example. Provision is also made for the step of selecting the landmark to be carried out in such a manner that a distance between the first position of the vehicle and the landmark is greater than the sum of the desired range of the vision sensor and the uncertainty range of the first position of the vehicle and/or the uncertainty range of the position of the landmark. In other words, the landmark is selected in such a manner that it is outside the desired range of the vision sensor even taking into account the uncertainty range(s). This ensures that the landmark only enters the detection range of the vision sensor during the further course of the vehicle movement (and therefore in the further course of the method).

A particularly advantageous development of the invention provides for the diagnostic method according to the invention to be performed repeatedly, that is to say a first time and at least one further time. In this case, a landmark which differs from the landmark selected and detected during the previous performance of the method is selected and detected during each further performance of the method. A mean value of the actual range is finally determined from the at least two determined actual ranges. In other words, provision is therefore made for the method to be carried out repeatedly and for a mean value to be formed from the respective results. This makes it possible to increase the reliability of the determined actual range by reducing the influence of possible error sources by forming the mean value. Possible error sources may include errors and/or inaccuracies in the landmark database and/or when determining the first and/or second position of the vehicle.

A vehicle according to the invention has a vision sensor with a desired range, a navigation apparatus for determining a position and a direction of movement of the vehicle, a data apparatus for accessing a landmark database for storing at least one position of at least one stationary landmark, and a diagnostic apparatus for carrying out the method according to the invention.

One embodiment provides for the landmark database to be part of the vehicle. For example, the landmark database may be stored in a data memory of the navigation apparatus or of the diagnostic apparatus.

An alternative embodiment provides for the landmark database to be arranged outside the vehicle, for example on an Internet server. In this embodiment, the vehicle has a communication module for data communication with the landmark database. Such data communication can be carried out using mobile radio (LTE, UMTS and the like) and/or WLAN, for example.

The invention is suitable for all types of vehicles, in particular for motor vehicles, in particular automobiles and trucks, and for motorcycles and for watercraft. In particular, the invention is suitable for vehicles which have a partially automatic or fully automatic driving mode.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures, identical reference symbols denote identical features of the illustrated embodiments of the invention. It is pointed out that the illustrated figures and the associated description are merely exemplary embodiments of the invention. In particular, illustrations of combinations of features in the figures and/or the description of the figures should not be interpreted such that the invention necessarily requires the implementation of all features mentioned. Other embodiments of the invention may contain fewer, more and/or other features. The scope of protection and the disclosure of the invention emerge from the accompanying patent claims and the complete description. It is also pointed out that the illustrations are basic illustrations of embodiments of the invention. The arrangement of the individual illustrated elements with respect to one another is only selected in an exemplary manner and may be selected differently in other embodiments of the invention. Furthermore, the illustration is not necessarily true to scale. Individual illustrated features may be illustrated in an enlarged or reduced manner for the purposes of better illustration.

Figure 1:
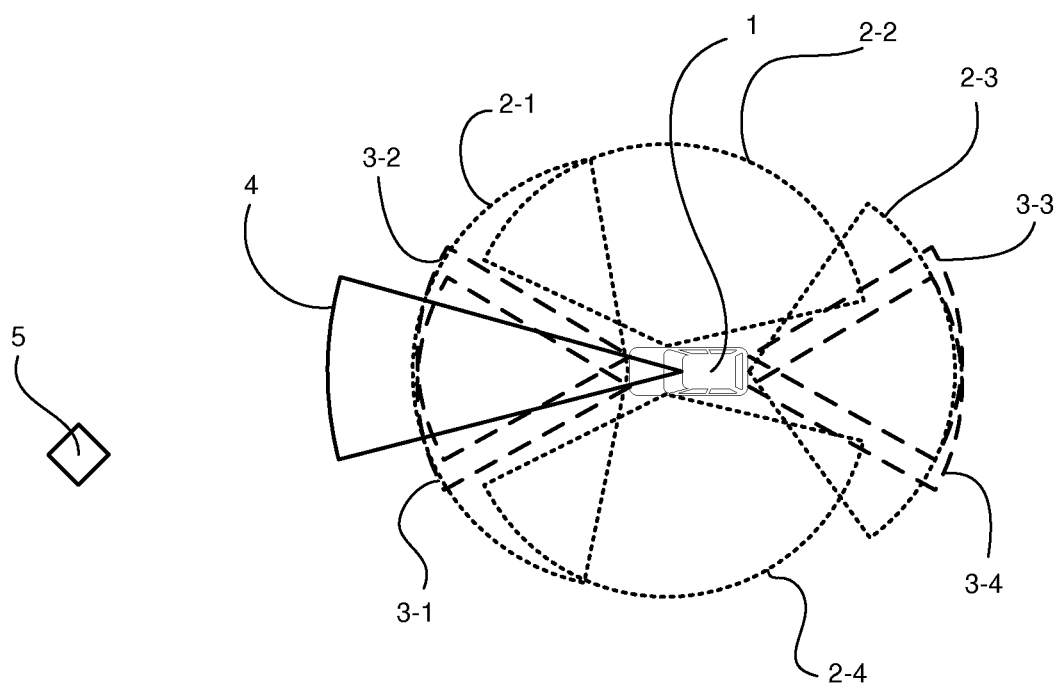
FIG. 1 is an illustration of a motor vehicle having a plurality of vision sensors and a stationary landmark.

FIG. 1 shows an illustration of a motor vehicle 1 in an exemplary traffic situation. The motor vehicle 1 is moving on a road (not illustrated) in the direction of a landmark 5. The vehicle has a plurality of vision sensors. A laser sensor is respectively arranged on the front side, the rear side, the left-hand side and the right-hand side of the vehicle 1. The detection ranges of the laser sensors are illustrated by dotted lines. The detection ranges are in the form of segments of a circle. This should be understood only in an exemplary manner since the detection range of a vision sensor may also have other forms. The respective radius corresponds to the desired range 2-1, 2-2, 2-3, 2-4 of the respective sensor. The vehicle 1 also has a total of four radar sensors. Two radar sensors are arranged on the left and on the right on the front side and two radar sensors are arranged on the left and on the right on the rear side of the vehicle 1. The detection ranges of the radar sensors are illustrated using dashed lines. The detection ranges are illustrated (again only in an exemplary manner) as segments of a circle. The radii correspond to the respective desired ranges 3-1, 3-2, 3-3, 3-4. The vehicle 1 also has a camera which is arranged on the windshield of the vehicle 1. The detection range of the camera is illustrated using a solid line. The camera has a desired range 4. A stationary landmark 5 which is situated at the edge of the road (not illustrated) on which the vehicle 1 is traveling can also be seen in FIG. 1. The landmark 5 is suitable for detection by the camera of the vehicle 1. The landmark 5 is symbolically illustrated using a diamond symbol. The landmark 5 could be a coded landmark and could actually have a diamond-shaped coding feature which makes it possible for the landmark 5 to be detected by the camera in a particularly reliable manner.

Figure 2:
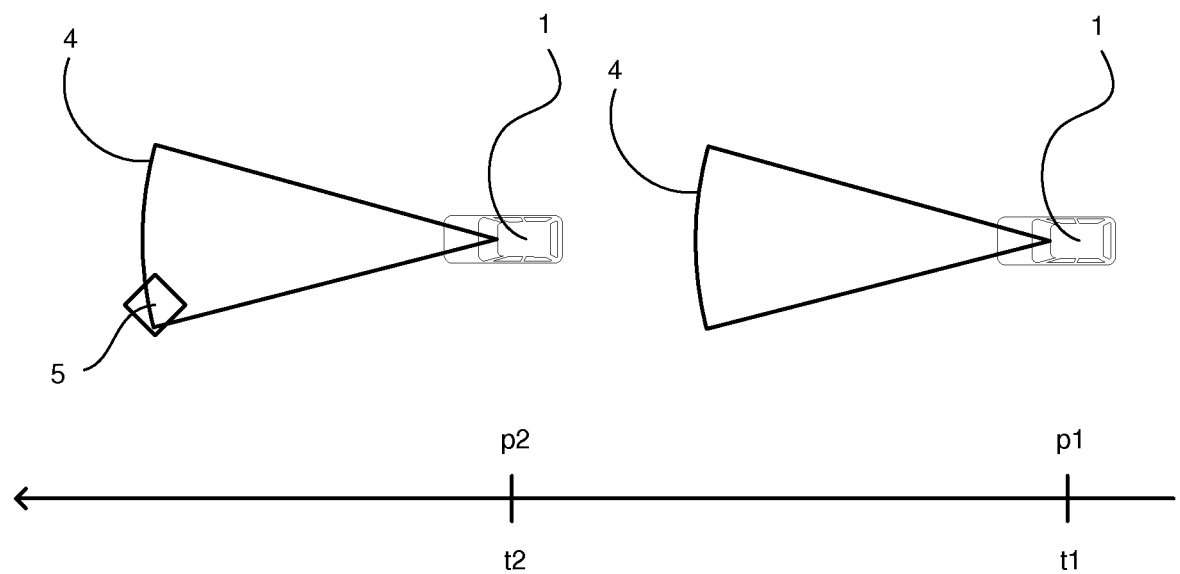
FIG. 2 is an illustration of a motor vehicle having a fully functional vision sensor and a stationary landmark at two different times.

FIG. 2 shows an illustration of a motor vehicle 1 having a fully functional vision sensor and a stationary landmark 5 at two different times t1, t2. The vision sensor is a camera. The camera is fully functional. Its actual range therefore corresponds to its desired range 4. The landmark 5 is suitable for detection by the camera. The direction of movement of the vehicle on the road (not illustrated) is indicated by an arrow. Times t1, t2 and positions p1, p2 of the vehicle are plotted on the arrow.

The sequence of the diagnostic method according to the invention is now intended to be explained by way of example for the camera of the vehicle 1 using the illustration in FIG. 2. The method is started at the time t1. At this time t1, the first position p1 of the vehicle 1 is determined. A suitable landmark is now searched for and selected in the landmark database. In the present example, the landmark 5 is selected since it satisfies all necessary conditions:

(i) the landmark 5 is suitable for detection by the camera;
(ii) the distance between the landmark 5 and the first position p1 is greater than the desired range 4 of the camera;
(iii) the landmark 5 is in front of the vehicle 1 in the direction of movement of the vehicle 1.

After the landmark 5 has been selected, the landmark 5 is detected by the camera. This step is carried out repeatedly while the vehicle 1 is moving in the direction of movement, which is indicated in FIG. 2 by the arrow directed to the left. While the vehicle therefore moves further from the first position p1, the camera continuously attempts to detect the landmark 5. This cannot be successful initially (that is to say at and close to the position p1) since the distance between the landmark 5 and the first position p1 is greater than the desired range 4 of the camera. However, the vehicle 1 approaches the landmark 5, with the result that the landmark 5 finally enters the detection range of the camera. This is the case at the time t2 at which the vehicle 1 is at the second position p2. At this time t2, the landmark 5 is successfully detected by the camera. In response to the detection of the landmark 5 by the camera, the second position p2 of the vehicle 1 is determined. Finally, the actual range of the camera is determined as the distance between the second position p2 of the vehicle 1 and the landmark 5. In the example illustrated in FIG. 2, the method reveals that the actual range is equal to the desired range 4. It can therefore be determined that the camera is fully functional.

Figure 3:
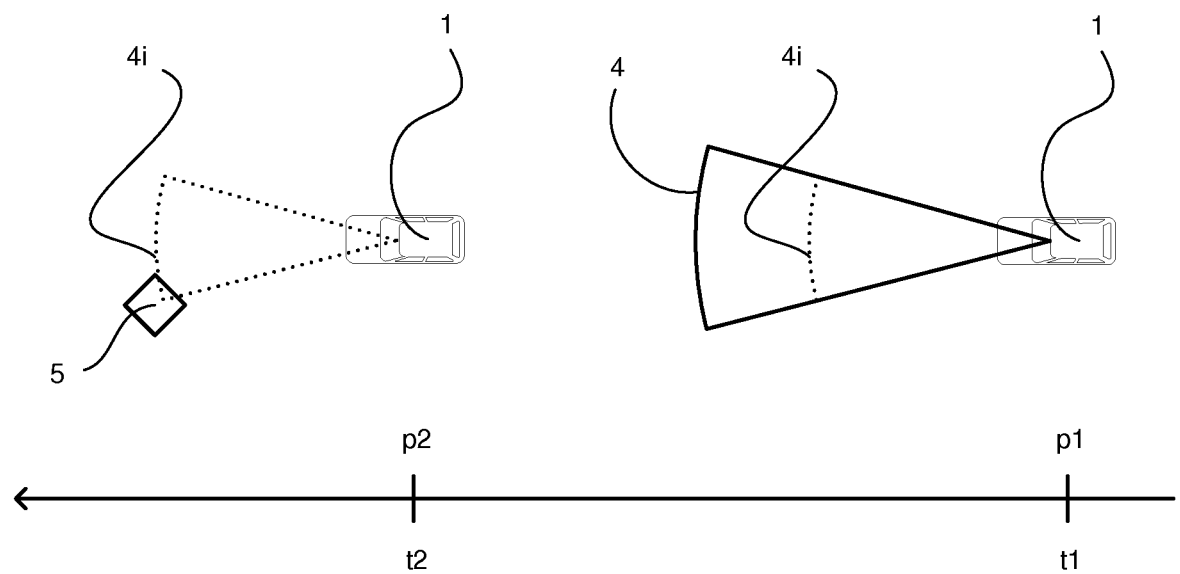
FIG. 3 is an illustration of a motor vehicle having a vision sensor with restricted functionality and a stationary landmark at two different times.

FIG. 3 shows an illustration of a motor vehicle 1 having a vision sensor with restricted functionality and a stationary landmark 5 at two different times t1, t2. The illustrated situation corresponds largely to that in FIG. 2, but the only difference is that the camera is not fully functional but rather has only restricted functionality in the example shown in FIG. 3. This is expressed in the fact that the actual detection range of the camera differs from the desired detection range of the camera. The desired detection range determined by the desired range 4 of the camera is illustrated using a solid line, like in FIG. 2. The actual detection range determined by the actual range 4i of the camera, which is reduced in comparison with the desired range 4, is illustrated using a dotted line.

The sequence of the diagnostic method according to the invention is now intended to be explained by way of example for the camera of the vehicle 1 using FIG. 3. As described with reference to FIG. 2, the method initially starts at the time t1. At this time t1, the first position p1 of the vehicle 1 is determined and the appropriate landmark 5 is searched for and selected in the landmark database. After the landmark 5 has been selected, the landmark 5 is detected by the camera. This step is carried out repeatedly while the vehicle 1 is moving in the direction of movement, as is indicated in FIG. 3 by the arrow directed to the left. While the vehicle therefore moves further from the first position p1, the camera continuously attempts to detect the landmark 5. This may not be successful initially (that is to say at and close to the position p1) since the distance between the landmark 5 and the first position p1 is greater than the desired range 4 of the camera. The vehicle 1 now again approaches the landmark 5. However, in contrast to the situation illustrated in FIG. 2, the camera cannot yet successfully detect the landmark 5 as soon as the landmark 5 enters the desired detection range formed by the desired range 4 since the camera has only restricted functionality and has a reduced actual range 4i. However, as the vehicle 1 increasingly approaches the landmark 5, the landmark 5 finally enters the actual detection range of the camera. This is the case at the time t2 at which the vehicle 1 is at the second position p2. The landmark 5 is successfully detected by the camera at this time t2. In response to the detection of the landmark 5 by the camera, the second position p2 of the vehicle 1 is determined. For illustration, it is pointed out that the time t2 in FIG. 3 is a later time than the time t2 in FIG. 2. The position p2 in FIG. 3 is likewise a position closer to the landmark 5 than the position p2 in FIG. 2. The actual range 4i of the camera is then determined as the distance between the second position p2 of the vehicle 1 and the landmark 5. In the example illustrated in FIG. 3, the method reveals that the actual range 4i is substantially shorter than the desired range 4. Different measures may be carried out on the basis of this knowledge. For example, provision may be made for the camera to no longer be used as a vision sensor for a partially automatic or fully automatic driving mode. Provision may be made for the partially automatic or fully automatic driving mode to therefore be deactivated until the camera is fully functional again. Provision may be made for the driver to receive a suggestion that he should have the camera checked and serviced in a workshop.

LIST OF REFERENCE SYMBOLS

1 Vehicle
2-1 to 2-4 Desired range (laser sensors)
3-1 to 3-4 Desired range (radar sensors)
4 Desired range (camera)
4i Actual range (camera)
5 Landmark
p1 First position of the vehicle
p2 Second position of the vehicle
t1, t2 Times The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A diagnostic method for a vision sensor of a vehicle, the vision sensor having a detection range, the method comprising the steps of:
    (a) determining a first position and a direction of movement of the vehicle;
    (b) selecting a stationary landmark, detectable by the vision sensor, from a landmark database, wherein the selected landmark is in front of the vehicle in the direction of movement of the vehicle, and wherein a distance between the first position of the vehicle and the selected landmark is greater than the detection range of the vision sensor;
    (c) detecting the selected landmark by the vision sensor;
    (d) in response to the detection of the landmark by the vision sensor, determining a second position of the vehicle at the time of the detection;
    (e) determining a restricted detection range of the vision sensor as a distance between the second position of the vehicle and the selected landmark; and
    determining an uncertainty range of the first position of the vehicle and/or an uncertainty range of a position of the landmark,
    wherein the step of selecting the stationary landmark is carried out such that a distance between the first position of the vehicle and the landmark is greater than a sum of the detection range of the vision sensor and the uncertainty range of the first position of the vehicle and/or the uncertainty range of the position of the landmark.

2. The diagnostic method as claimed in claim 1, wherein the vision sensor is a camera, a laser sensor, a lidar sensor, a radar sensor, an ultrasonic sensor or a bolometer.

3. The diagnostic method as claimed in claim 1, wherein the landmark is a coded landmark.

4. The diagnostic method as claimed in claim 1, wherein the landmark is a passive landmark.

5. The diagnostic method as claimed in claim 1, further comprising:
    (f) iteratively performing steps (a) through (e) at least one further time with a subsequent landmark that differs from the landmark selected and detected during a previous iteration, and
    (g) determining a mean value of the restricted detection ranges determined at each iteration.

* * * * *